United States Patent Office 3,369,456
Patented Feb. 20, 1968

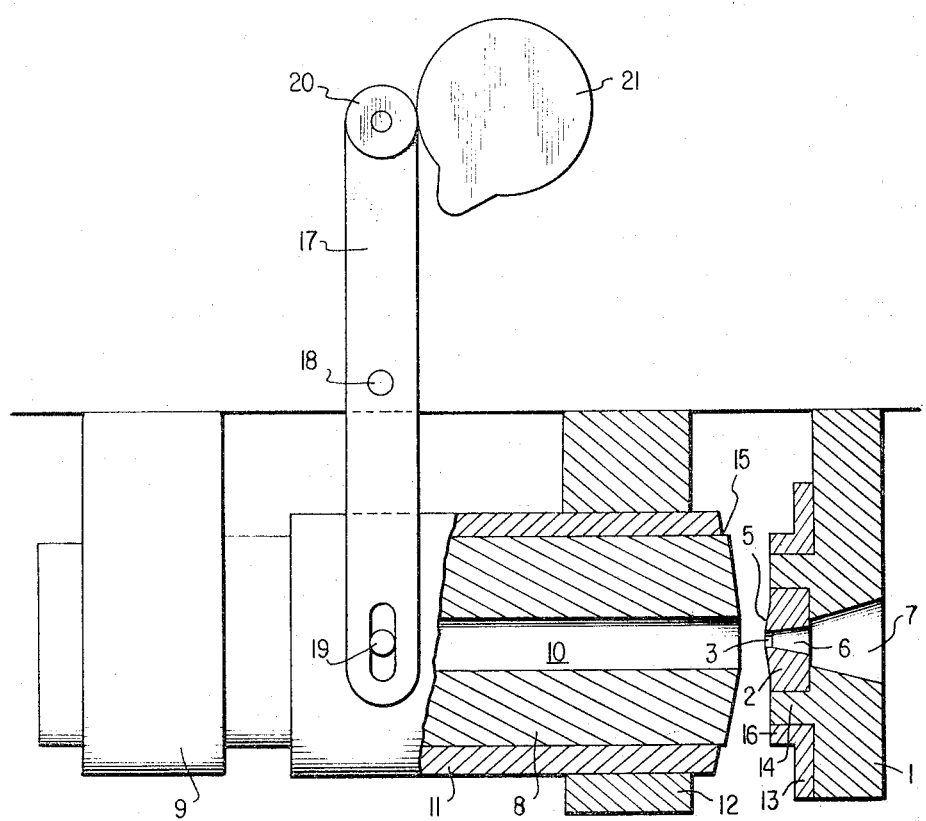
FIG. I

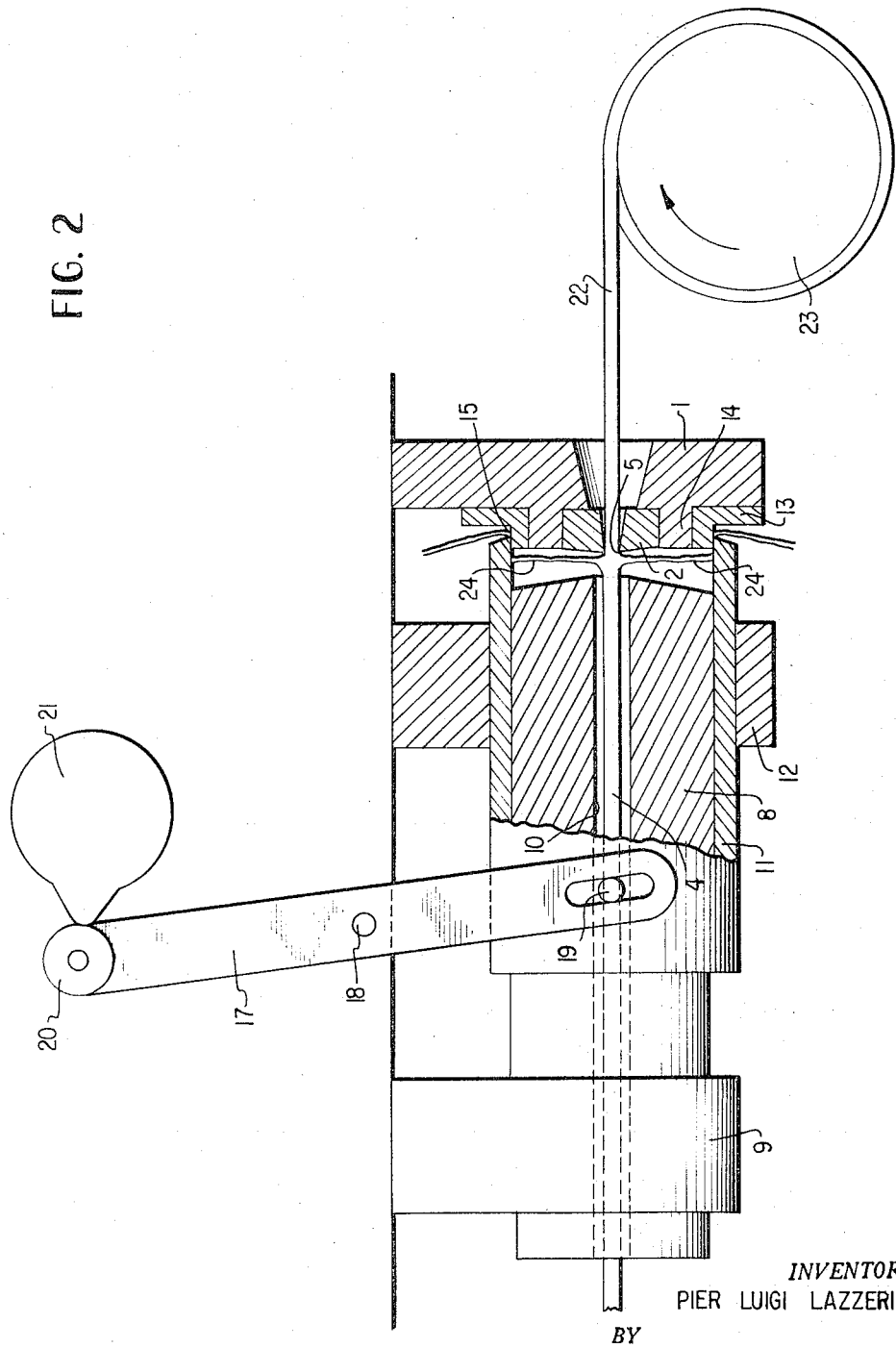

3,369,456
SCALPING APPARATUS
Pier Luigi Lazzerini Fornaci di Barga, Italy, assignor to Società Metallurgica Italiana
Filed Feb. 9, 1966, Ser. No. 526,132
Claims priority, application Italy, Mar. 11, 1965, 5,960/65
9 Claims. (Cl. 90—24)

The present invention relates to apparatus for scalping elongated work of uniform cross section, in order to remove an outer layer of predetermined thickness.

As is known, such apparatus ordinarily comprises a scalping die having a sharp-edged orifice of suitable cross-sectional configuration, through which elongated work is drawn under traction by known tractive means. During this operation, a surface layer of the work is removed in the form of shavings or cuttings which, especially in the case of highly plastic materials, may reach a considerable length, and, by sliding on the front face of the die, will remain adjacent the die thereby giving rise to considerable difficulties in the course of further processing of the work. This disadvantage may be particularly troublesome when means are provided for automatically performing the scalping operations, as it is then necessary to ensure that a human operator manually remove the shavings.

Attempts have been made to avoid the presence of long shavings or cuttings adjacent the die. It has been proposed to cut a helical incision in the surface of the work, before scalping, so that the shavings produced during scaping will break and fall from the working area. However, this expedient has the disadvantage that the product remains marked or scored on what would otherwise be its finished surfaces.

Accordingly, it is an object of the present invention to provide apparatus for scalping elongated work, in which the cut-off material scalped from the work by the die is removed from the area of the die in a fully automatic manner and without causing damage to the finished surface of the product.

Another object of the present invention is the provision of apparatus for scalping elongated work, which will be relatively simple and inexpensive to manufacture, easy to operate, maintain and repair, and rugged and durable in use.

Other objects and advantages of the present invention will become apparent from a consideration of the following description, taken in connection with the accompanying drawings, in which:

FIGURE 1 is a view partially in section, of apparatus according to the present invention, in the inactive position of the scrap-cutting means; and FIGURE 2 is a view similar to FIG. 1 but showing the scrap-cutting means in its active or cutting position, and showing the relationship of the work to the apparatus and the position of the scrap relative to the apparatus.

Briefly, the invention is the discovery that improved apparatus for scalping elongated work of uniform cross section may be provided, comprising a stationary die holder, a scalping die mounted on the die holder, a stationary shearing tool having a cutting edge encompassing the axis of the die, a movable shearing tool having a cutting edge encompassing the axis of the die, and means for moving the movable shearing tool toward and away from the stationary shearing tool to cause the two cutting edges to coact to cut off material scalped from the work by the die. In preferred embodiments of the invention, those cutting edges are circular and are concentric with the axis, and the movable tool is movable along that axis. Also, there is preferably provided a stationary cylindrical support member coaxial with the axis of the die, the movable tool comprising a cylindrical sleeve slidable on that support member. It is also preferred that a fixed bracket be provided which has a cylindrical hole therein, the cylindrical sleeve comprising the movable tool being disposed in sliding contact with the inside of that hole. It is also preferred that the support member for the slidable sleeve have a central opening for the passage therethrough of the elongated work, and that the support member have a surface encompassing the work and defining with at least one of the die and the die holder an annular space about the axis of the die, for the radial outward passage of material scalped from the work; and preferably, that annular space has an extent radially of the axis of the die which is substantially greater than its extent parallel to the axis of the die. It is also preferred that the means for moving the movable tool comprise a lever mounted between its ends on the apparatus and having lost-motion connection with the movable tool at one end and drive-cam means for swinging the other end of the lever.

Referring now to the drawings in greater detail, there is shown apparatus for scalping elongated work of uniform cross section, comprising a die head or stationary die holder 1 secured to the bed plate (not shown) of the apparatus. A scalping die 2 is secured to the die holder in any suitable known manner.

Scalping die 2 is provided with an orifice 3 therethrough delimited by cutting edges 5 and having a cross-sectional configuration corresponding to the particular profile which it is desired to impart to elongated work of uniform cross section shown at 4. The cutting edges 5 of scalping die 2 perform the operation of planing or scalping material from the outer surface of the elongated work 4, which issues, after said operation, from the conical discharge openings 6 and 7 of the die and the die holder, respectively.

On the side of the die holder opposite to that from which the product emerges, and coaxial with the die, is disposed a support member 8 comprising a metal cylinder fastened to the bed plate of the apparatus by means of a depending bracket 9. Support member 8 has an axial bore 10 therethrough for feeding and guiding the work 4 to the scalping die 2. Bore 10 is coaxial with die 2.

A movable shearing tool 11 is mounted for sliding movement on and coaxially of support member 8. Tool 11 comprises a cylindrical metal sleeve coaxial with the axis of the die. A support bracket 12 also depends from the bed plate of the apparatus and has a cylindrical hole therethrough in which the outer surface of tool 11 is slidably disposed with slight clearance.

The face of the support member 8 toward the die 2 can be flat, concave or convex, or of any other suitable shape, but is disposed so as to define, with the corresponding face of die 2 or die holder 1, an annular space of substantially greater extent radially of the axis of the die than parallel to the axis of the die. In other words, this annular space is shaped like a flat disc. This annular space provides for the passage of shavings or scraps radially outwardly, and the relatively restricted dimension of this space parallel to the axis of the die ensures that travel of the shavings will be substantially radially outward toward the movable shearing tool 11.

The movement of tool 11 is quite accurately parallel to the axis of the die, and tool 11 cooperates with a stationary shearing tool 13 which is shrunk fitted or otherwise secured to an annular projection 14 on die holder 1. Thus, projection 14 encircles die 2, while stationary shearing tool 13 encircles annular projection 14.

The movable shearing tool 11 and the stationary shearing tool 13 have coacting cutting edges, indicated at 15 and 16, respectively, which are circular and which serve, upon reciprocation of movable tool 11, to shear off scrap as shown in FIG. 2.

Axial reciprocation is imparted to movable shearing tool 11 by means of any suitable mechanism, so as to cause it to move between the two extreme positions of FIGS. 1 and 2. For example, there can be provided a lever 17 pivoted at 18 to the bedplate of the apparatus and having lost-motion connection at one end with a pin 19 carried by movable tool 11 and at the other end a cam follower 20 which is moved by a rotating cam 21 driven by motor means (not shown) periodically to swing cam follower 20 to the left as seen in FIGS. 1 and 2 thereby to rotate lever 17 a short distance counterclockwise as seen in FIGS. 1 and 2, thereby to move tool 11 from the position of FIG. 1 to the position of FIG. 2. Appropriate return means (not shown) such as spring means may be provided for returning lever 17 from the position of FIG. 2 to the position of FIG. 1. Alternatively, of course, a linkage system of the crank and connecting rod type could be used, or the drive of shearing tool 11 could be effected by means of a piston of a hydraulic or pneumatic unit.

Referring particularly to FIG. 2, the operation of the apparatus of the invention is as follows:

The elongated work 4 of uniform cross section proceeds, for example, from a spool (not shown) to the right as seen in FIG. 2, through the bore 10 in the support member 8, and is forced through the scalping die 2 by tension exerted by a take-up reel 23 on a length 22 of the work that has already passed through the die. The cutting edges 5 about the orifice 3 of the die 2 perform a planing or scalping operation on the work passing therethrough.

The scrap or shavings shown at 24 tend to run or slide on the front face of the die and die holder, and are thus disposed in the annular space referred to above. When these shavings have reached a certain length, they are cut by the coacting cutting edges 15 and 16 of the movable and stationary tools, by operation of the mechanism described above, after which the tool 11 returns to its position shown in FIG. 1.

It is of course apparent that the length of the shavings cut off may be predetermined by the speed of drawing the elongated work through the die, and also by the frequency of reciprocation of the tool 11.

From a consideration of the foregoing disclosure, therefore, it will be evident that all the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Apparatus for scalping elongated work of uniform cross section, comprising a stationary die holder, a scalping die mounted on the die holder, a stationary shearing tool having a cutting edge encompassing the axis of the die, a movable shearing tool having a cutting edge encompassing the axis of the die, and means for moving said movable shearing tool toward and away from said stationary shearing tool to cause the two said cutting edges to coact to cut off material scalped from the work by the die.

2. Apparatus as claimed in claim 1, said cutting edges being circular and concentric with said axis.

3. Apparatus as claimed in claim 1, said movable tool being movable along said axis.

4. Apparatus as claimed in claim 1, and a stationary cylindrical support member coaxial with said axis, said movable tool comprising a cylindrical sleeve slidable on said support member.

5. Apparatus as claimed in claim 4, and a fixed bracket having a cylindrical hole therein, said cylindrical sleeve being disposed in sliding contact with the inside of said hole.

6. Apparatus as claimed in claim 4, said support member having a central opening therethrough for the passage therethrough of said elongated work.

7. Apparatus as claimed in claim 4, said support member having a surface encompassing the work and defining with at least one of said die and die holder an annular space about said axis for the radial outward passage of said material scalped from the work.

8. Apparatus as claimed in claim 7, said annular space having an extent radially of said axis substantially greater than its extent parallel to said axis.

9. Apparatus as claimed in claim 1, said means for moving said movable tool comprising a lever mounted intermediate its ends on the apparatus and having lost-motion connection with the movable tool at one end, and drive-cam means for swinging the other end of the lever.

References Cited

UNITED STATES PATENTS 2,315,994  4/1943  Wilcox.
2,323,700  7/1943  Bailey.

GERALD A. DOST, *Primary Examiner.*